(12) United States Patent
Goodwin et al.

(10) Patent No.: US 6,560,504 B1
(45) Date of Patent: May 6, 2003

(54) USE OF CONTAMINATION-FREE MANUFACTURING DATA IN FAULT DETECTION AND CLASSIFICATION AS WELL AS IN RUN-TO-RUN CONTROL

(75) Inventors: Thomas J. Goodwin, Austin, TX (US); Iraj Emami, Austin, TX (US); Charles E. May, Gresham, OR (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/408,241

(22) Filed: Sep. 29, 1999

(51) Int. Cl.[7] ............................................. G06F 19/00
(52) U.S. Cl. ........................................ 700/121; 438/14
(58) Field of Search ................... 700/121, 117, 700/123, 109, 110; 438/14, 5, 7–9, 16

(56) References Cited

U.S. PATENT DOCUMENTS

| | | | | |
|---|---|---|---|---|
| 5,926,690 A | * | 7/1999 | Toprac et al. ................. | 438/17 |
| 6,161,054 A | * | 12/2000 | Rosenthal et al. ............ | 700/121 |
| 6,242,270 B1 | * | 6/2001 | Nagaswami et al. .......... | 438/14 |
| 6,311,096 B1 | * | 10/2001 | Saxena et al. ................ | 700/121 |
| 6,324,481 B1 | * | 11/2001 | Atchison et al. ............. | 702/84 |
| 6,388,253 B1 | * | 5/2002 | Su ................................. | 250/310 |

* cited by examiner

Primary Examiner—Leo Picard
Assistant Examiner—Zoila Cabrera
(74) Attorney, Agent, or Firm—Williams, Morgan & Amerson

(57) ABSTRACT

A method is provided for manufacturing, the method including processing a workpiece in a processing step, detecting defect data after the processing of the workpiece in the processing step has begun and forming an output signal corresponding to at least one type of defect based on the defect data. The method also includes feeding back a control signal based on the output signal to adjust the processing performed in the processing step to reduce the at least one type of defect.

13 Claims, 7 Drawing Sheets

Figure 1:
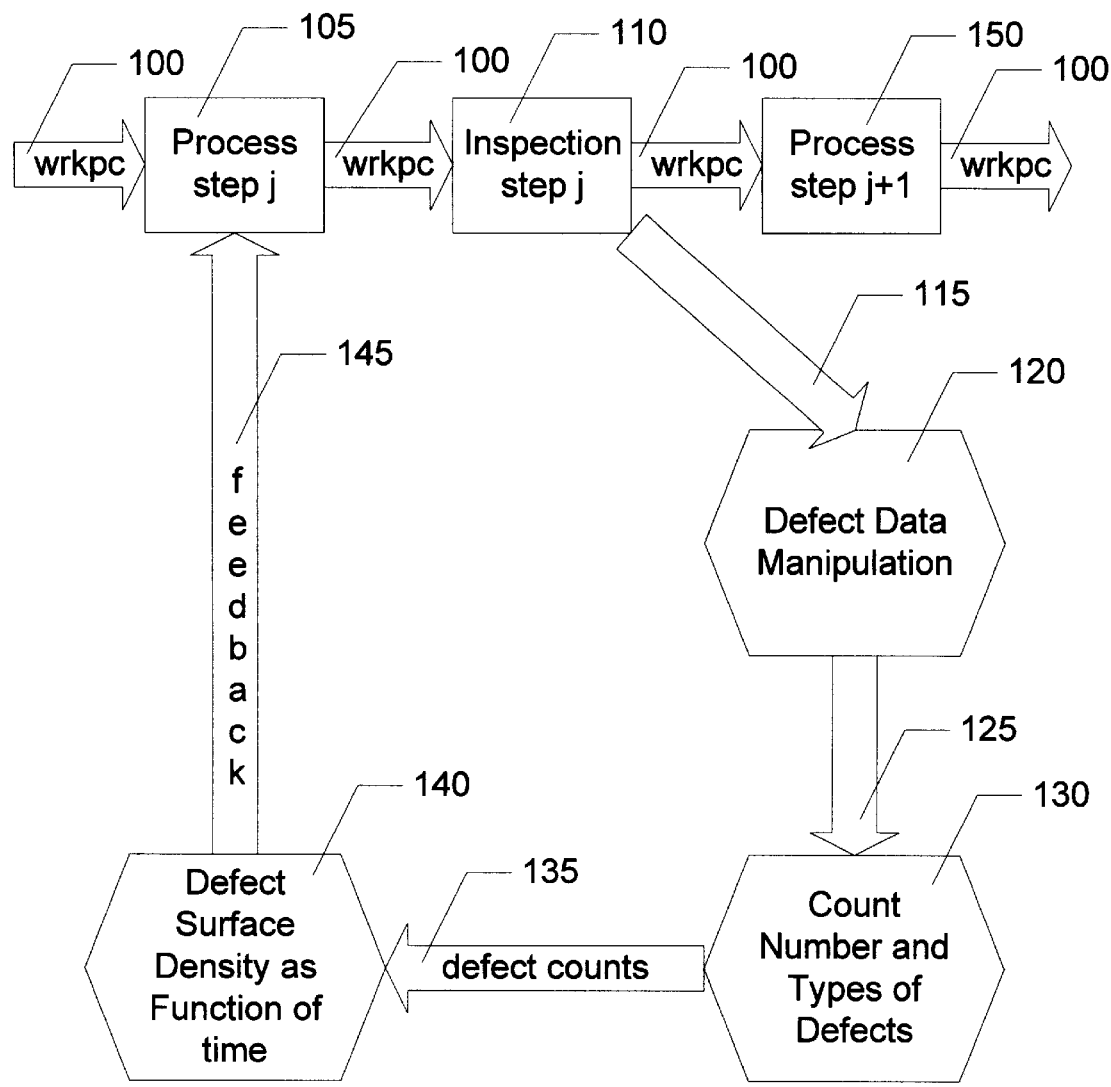

USE OF CONTAMINATION-FREE MANUFACTURING DATA IN FAULT DETECTION AND CLASSIFICATION AS WELL AS IN RUN-TO-RUN CONTROL

BACKGROUND OF THE INVENTION

1. Field of the Invention

This invention relates generally to semiconductor fabrication technology, and, more particularly, to a method for manufacturing a workpiece.

2. Description of the Related Art

There is a constant drive within the semiconductor industry to increase the quality, reliability and throughput of integrated circuit devices, (e.g., microprocessors, memory devices, and the like. This drive is fueled by consumer demands for higher quality computers and electronic devices that operate more reliably. These demamnds have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

The technologies underlying semiconductor processing tools have attracted increased attention over the last several years, resulting in substantial refinements. However, despite the advances made in this area, many of the processing tools that are currently commercially available suffer certain deficiencies. In particular, such tools; often lack advanced process data monitoring capabilities, such as the ability to provide historical parametric data in a user-friendly format, as well as event logging, real-time graphical display of both current processing parameters and the processing parameters of the entire run, and remote, ie., local site and worldwide, monitoring. These deficiencies can engender nonoptimal control of critical processing parameters, such as throughput accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a mean of monitoring this variability, as well as providing means for optimizing control of critical parameters.

The present invention is directed to overcoming, or it least reducing the effects of, one or more of the problems set forth above.

SUMMARY OF THE INVENTION

In one aspect of the present invention, a method is provided for manufacturing, the method including processing a workpiece in a processing step, detecting defect data after the processing of the workpiece in the processing step has begun and forming an output signal corresponding to at least one type of defect based on the defect data. The method also includes feeding back a control signal based on the output signal to adjust the processing performed in the processing step to reduce the at least one type of defect.

BRIEF DESCRIPTION OF THE, DRAWINGS

The invention may be understood by reference to the following description taken in conjunction with the accompanying drawings, in which the leftmost significant digit(s) in the reference numerals denote(s) the first figure in which the respective reference numerals appear, and in which:

FIGS. 1–5 illustrate schematically various embodiments of a method for manufacturing according to the present invention; and FIGS. 6–10 illustrate schematically various alternative embodiments of a method for manufacturing according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives failing within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method for manufacturing according to the present invention are shown in FIGS. 1–10. As shown in FIG. 1, a workpiece 100, such as a semiconducting substrate or wafer, for example, is delivered to a processing step j 105, where j may have any value from j=1 to j=N. The total number N of processing steps, such as masking, etching, depositing material and the like, used to form the finished workpiece 100, may range from N=1 to about any finite value.

As shown in FIG. 1, the workpiece 100 is sent from the processing step j 105 and delivered to an inspection step j 110. In the inspection step j 110, the workpiece 100 is inspected to detect data indicative of defective processing in the processing step j 105. For example, in the inspection step j 110, the workpiece 100 may be scanned by an inspection tool (not shown) capable of detecting metal bridges formed between features on the workpiece 100, producing scan data 115 indicative of defective processing. Additionally, and/or alternatively, in the inspection step j 110, the workpiece 100 may be scanned by an inspection tool capable of detecting microscratches, ragged polysilicon (poly) lines, blue dots (e.g., small circular defects detected optically, having a blue tint), extra patterns, and the like, formed on the workpiece 100, again producing scan data 115 indicative of defective processing.

As shown in FIG. 1, the scan data 115 is sent from the inspection step j 110 and delivered to a defect data manipulation step 120. In the defect data manipulation step 120, the scan data 115 may be manipulated, for example, by being classified according to the type of defect detected, producing an output signal 125.

Figure 2:
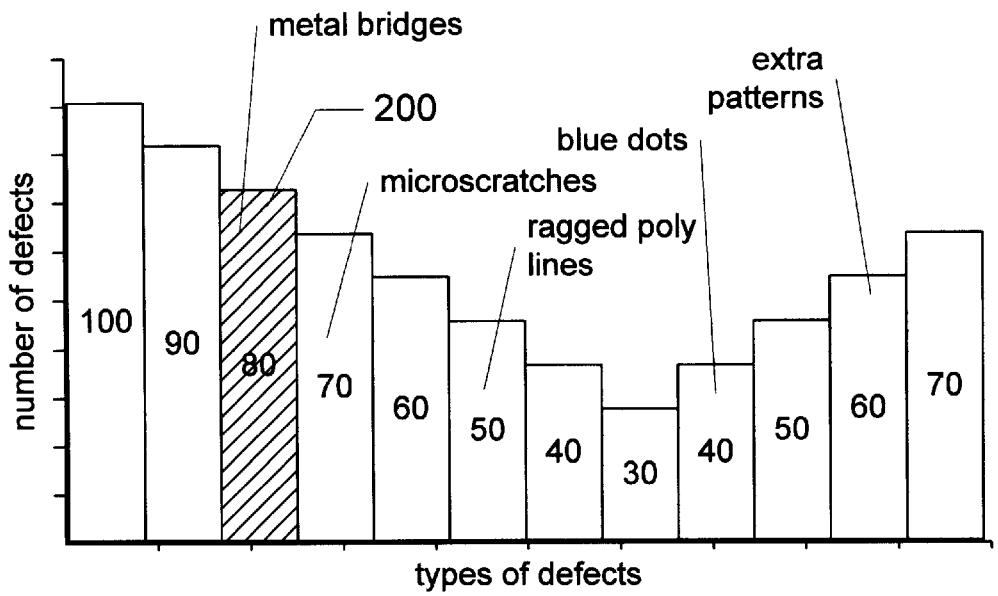

As shown in FIG. 1, the output signal 125 is sent from the defect data manipulation step 120 and delivered to a first defect data display step 130. In the first defect data display step 130, the output signal 125 may be displayed, for example, by being presented in the form of a histogram, as illustrated in FIG. 2, showing both the count number (defect counts 135) and the types of defects represented by the output signal 125. As shown in FIG. 2, in one illustrative embodiment, the number of metal bridges (shown shaded at 200) formed between features on the workpiece 100 is about 80, in the location scanned, for the duration of the scan. Similarly, the number of microscratches is about 70, the number of ragged poly lines is about 50, the number of blue dots is about 40 and the number of extra patterns is about 60, for example.

The display of the output signal 125 in the first defect data display step 130 may be used to alert an engineer of the need to adjust the processing performed in the processing step j 105 to reduce at least one type of defect detected in the inspection step j 110. The engineer may also alter, for example, the classification of the scan data 115, in the defect data manipulation step 120, according to the type of defect detected, affecting the output signal 125 produced.

Figure 3:
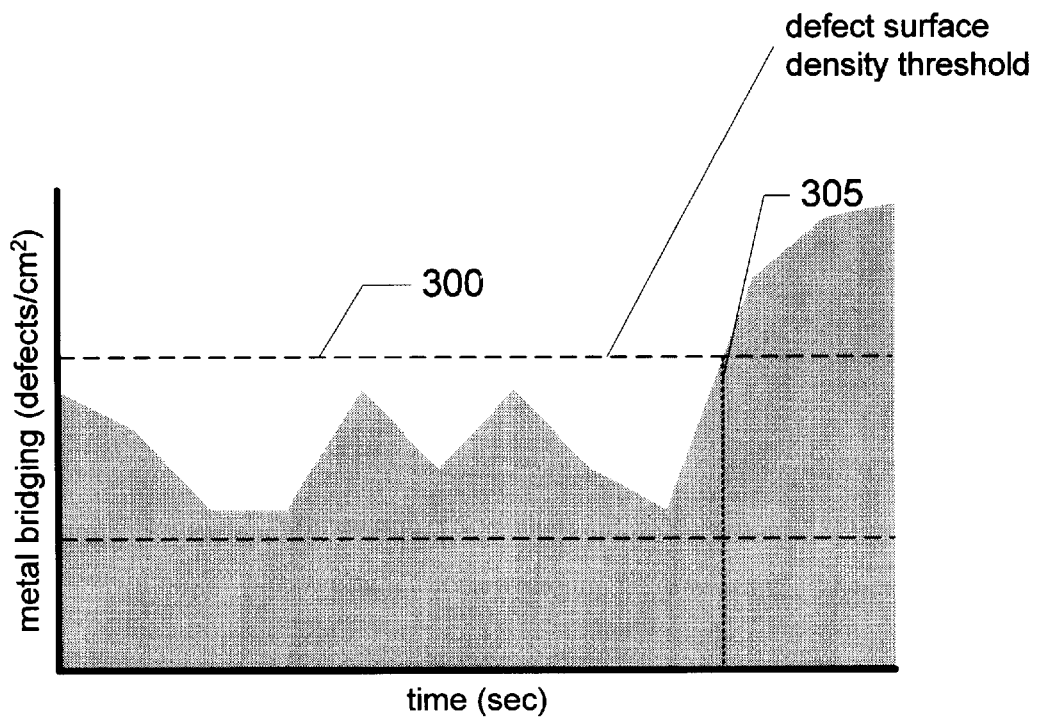

As shown in FIG. 1, the defect counts 135 are sent from the first defect data display step 130 and delivered to a second defect data display step 140. In the second defect data display step 140, the defect counts 135 may be displayed, for example, by being presented in the form of a graph, as illustrated in FIG. 3, showing the number of defects/cm$^2$ (defect surface density) on the surface of the workpiece 100 plotted as a function of time (measured in seconds). As shown in FIG. 3, in one illustrative embodiment, the number of metal bridges/cm$^2$ formed between features on the workpiece 100 eventually crosses a defect surface density threshold 300 (shown in dashed phantom) at a time 305 (shown in dotted phantom).

The display of the defect counts 135 in the second defect data display step 140 may be used to alert an engineer of the need to adjust the processing performed in the processing step j 105 to reduce at least one type of defect detected in the inspection step j 110. The engineer may also adjust, for example, the defect surface density threshold 300 (shown in dashed phantom). The engineer may also select, for example, the type of defect whose defect counts 135 are to be displayed in the second defect data display step 140.

As shown in FIG. 1, a feedback control signal 145 is sent from the second defect data display step 140 to the processing step j 105 to adjust the processing performed in the processing step j 105 to reduce at least one type of defect detected in the inspection step j 110. In one illustrative embodiment, as shown in FIG. 3, when the number of metal bridges/cm$^2$ formed between features crosses the defect surface density threshold 300 (shown in dashed phantom) at the time 305 (shown in dotted phantom), the feedback control signal 145 may act to cause the processing performed in the processing step j 105 to increase the overetch time.

As shown in FIG. 1, the workpiece 100 is sent from the inspection step j 110 and delivered to a processing step j+1 150. In the processing step j+1 150, the workpiece 100 undergoes another one of the total number N of processing steps, such as masking, etching, depositing material and the like, used to form the finished workpiece 100. As shown in FIG. 1, the workpiece 100 is then sent from the processing step j+1 150.

Figure 4:
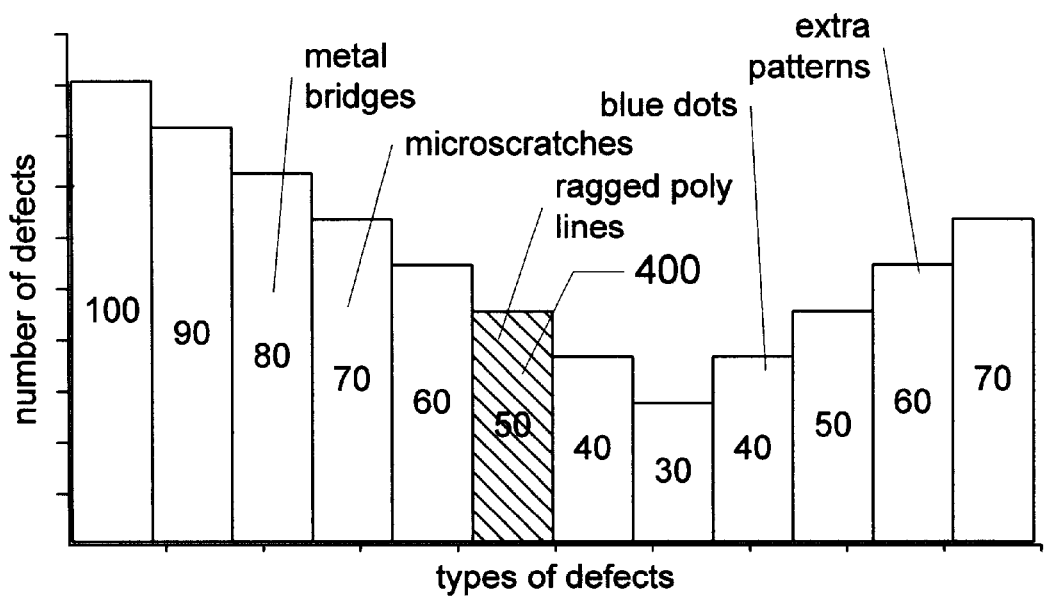
Figure 5:
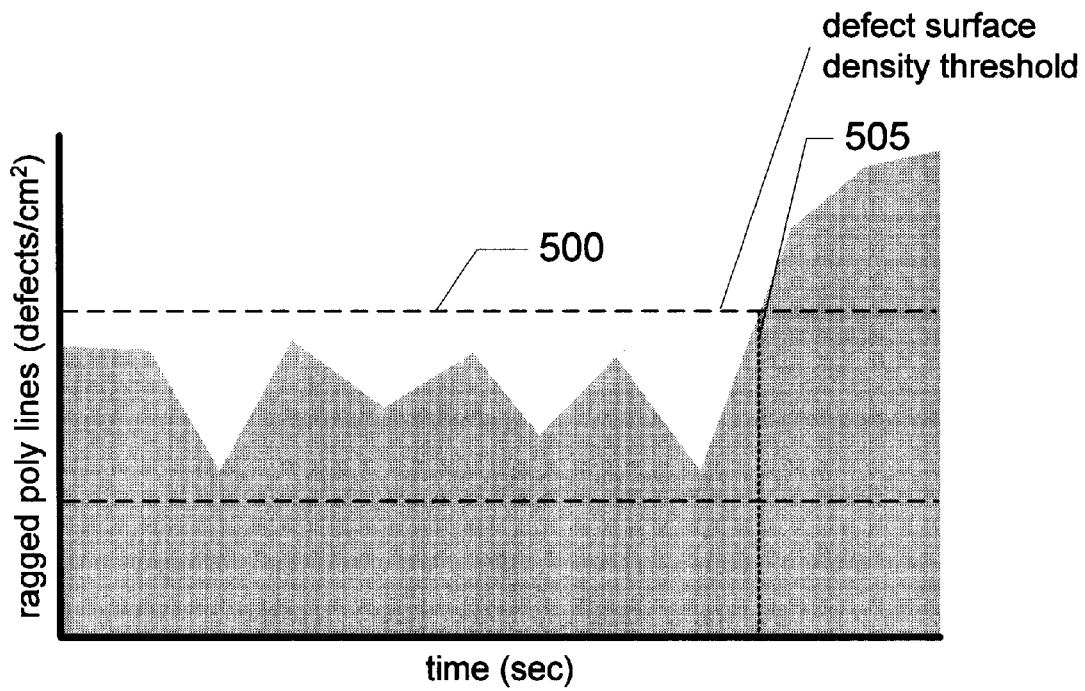

As shown in FIG. 4, in another illustrative embodiment, the number of ragged poly lines (shown shaded at 400) formed on the workpiece 100 is about 50, in the location scanned, for the duration of the scan. As shown in FIG. 5, in this illustrative embodiment, the number of ragged poly lines/cm$^2$ formed on the workpiece 100 eventually crosses the defect surface density threshold 500 (shown in dashed phantom) at the time 505 (shown in dotted phantom). In this illustrative embodiment, as shown in FIG. 1, the feedback control signal 145 may act to cause the processing performed in the processing step j 105 to decrease the poly etch time.

As shown in FIGS. 2 and 4, in yet another illustrative embodiment, the number of metal bridges (shown shaded at 200 in FIG. 2) formed between features on the workpiece 100 is about 80, and the number of ragged poly lines (shown shaded at 400 in FIG. 4) formed on the workpiece 100 is about 50, in the location scanned, for the duration of the scan. As shown in FIGS. 3 and 5, in this illustrative embodiment, the number of metal bridges/cm$^2$ formed between features on the workpiece 100 eventually crosses the defect surface density threshold 300 (shown in dashed phantom in FIG. 3) at the time 305 (shown in dotted phantom in FIG. 3), and the number of ragged poly lines/cm$^2$ formed on the workpiece 100 eventually crosses the defect surface density threshold 500 (shown in dashed phantom in FIG. 5) at the time 505 (shown in dotted phantom in FIG. 5). In this illustrative embodiment, as shown in FIG. 1, the feedback control signal 145 may act to cause the processing performed in the processing step j 105 to both increase the overetch time of the metal lines and decrease the poly etch time, for example, when the processing performed in the processing step j 105 permits simultaneous, and yet selective, etching of both the metal lines and the poly.

In one illustrative embodiment, in both the first and second defect data display steps 130 and 140, the engineer may be provided with advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These capabilities may engender more optimal control of critical processing parameters, such as throughput accuracy, stability and repeatability, processing temperatures, mechanical tool parameters, and the like. This more optimal control of critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such an illustrative embodiment of a method of manufacturing according to the present invention, a monitoring and diagnostics system may be provided that monitors this variability and optimizes control of critical parameters.

Figure 6:
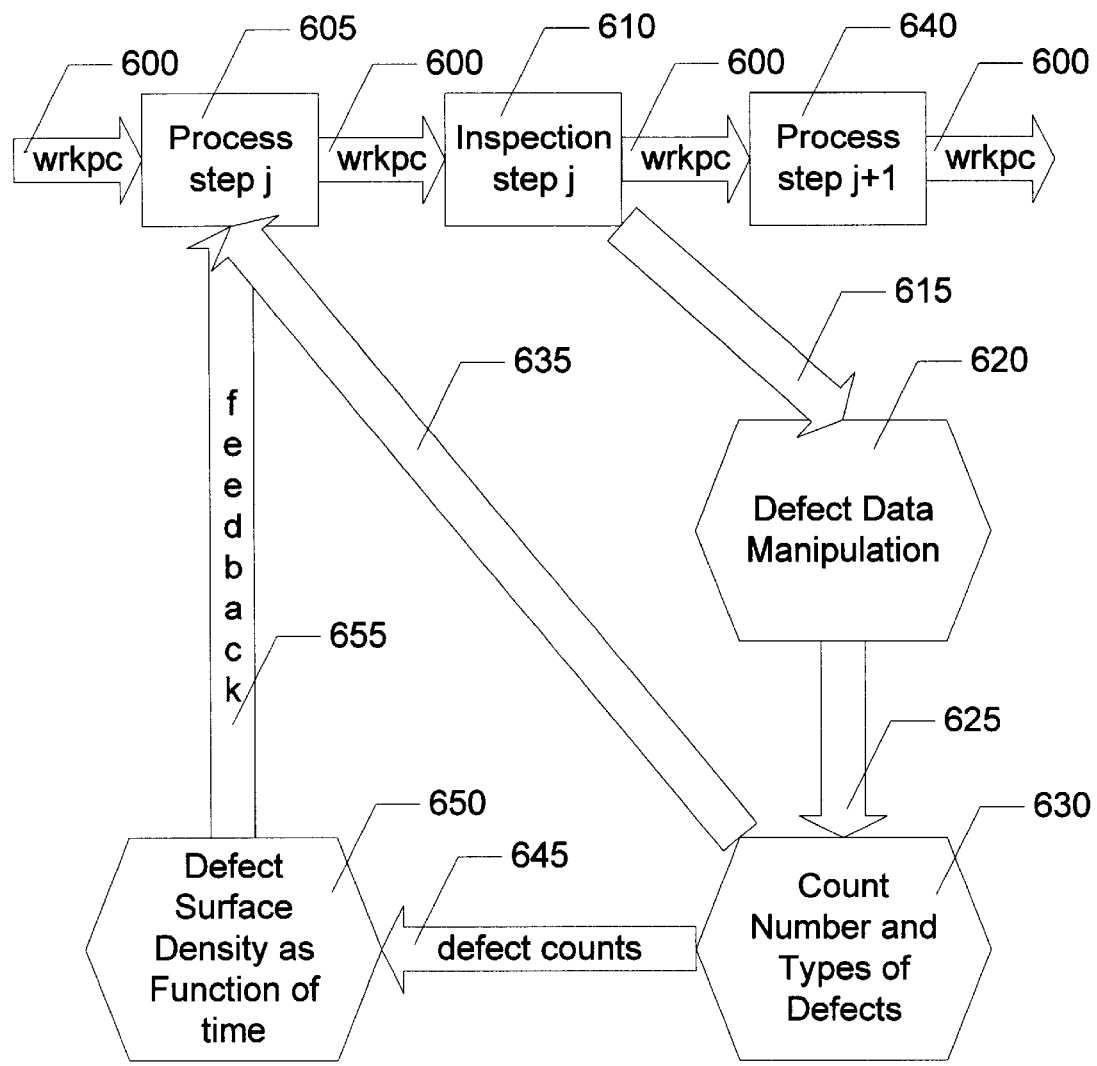

As shown in FIG. 6, a workpiece 600, such as a semi-conducting substrate or wafer, for example, is delivered to a processing step j 605, where j may have any value from j=1 to j=N. The total number N of processing steps, such as masking, etching, depositing material and the like, used to form the finished workpiece 600, may range from N=1 to about any finite value.

As shown in FIG. 6, the workpiece 600 is sent from the processing step j 605 and delivered to an inspection step j 610. In the inspection step j 610, the workpiece 600 is inspected to detect data indicative of defective processing in the processing step j 605. For example, in the inspection step j 610, the workpiece 600 may be scanned by an inspection tool capable of detecting metal bridges formed between features on the workpiece 600, producing scan data 615 indicative of defective processing. Additionally, and/or alternatively, in the inspection step j 610, the workpiece 100 may be scanned by an inspection tool capable of detecting microscratches, ragged polysilicon (poly) lines, blue dots, extra patterns, and the like, formed on the workpiece 600, again producing scan data 615 indicative of defective processing.

As shown in FIG. 6, the scan data 615 is sent from the inspection step j 610 and delivered to a defect data manipulation step 620. In the defect data manipulation step 620, the scan data 615 may be manipulated, for example, by being classified according to the type of defect detected, producing the output signal 625.

As shown in FIG. 6, the output signal 625 is sent from the defect data manipulation step 620 and delivered to a first defect data display step 630. In the first defect data display step 630, the output signal 625 may be displayed, for example, by being presented in the form of a histogram, as illustrated in FIGS. 2 and 4, showing both the count number (defect counts 645) and the types of defects represented by the output signal 625. As shown in FIG. 2, in one illustrative embodiment, the number of metal bridges (shown shaded at 200) formed between features on the workpiece 100 is about 80, in the location scanned, for the duration of the scan. Similarly, as shown in FIG. 4, the number of ragged poly lines (shown shaded at 400) is about 50, in the location scanned, for the duration of the scan.

The display of the output signal 625 in the first defect data display step 630 may be used to alert an engineer of the need to adjust the processing performed in the processing step j 605 to reduce at least one type of defect detected in the inspection step j 610. The engineer may also alter, for example, the classification of the scan data 615, in the defect data manipulation step 620, according to the type of defect detected, affecting the output signal 625 produced.

As shown in FIG. 6, a feedback control signal 635 is sent from the first defect data display step 630 to the processing step j 605 to adjust the processing performed in the processing step j 605 to reduce at least one type of defect detected in the inspection step j 610. In one illustrative embodiment, as shown in FIG. 2, when the number of metal bridges (shown shaded at 200) formed between features on the workpiece 600 exceeds a predetermined value, for example, about 80, the feedback control signal 635 may act to cause the processing performed in the processing step j 605 to increase the overetch time. In another illustrative embodiment, as shown in FIG. 4, when the number of ragged poly lines (shown shaded at 400) formed on the workpiece 600 exceeds a predetermined value, for example, about 50, the feedback control signal 635 may act to cause the processing performed in the processing step j 605 to decrease the poly etch time.

As shown in FIG. 6, the workpiece 600 is sent from the inspection step j 610 and delivered to a processing step j+1 640. In the processing step j+1 640, the workpiece 600 undergoes another one of the total number N of processing steps, such as masking, etching, depositing material and the like, used to form the finished workpiece 600. As shown in FIG. 6, the workpiece 600 is then sent from the processing step j+1 640.

As shown in FIG. 6, in addition to, and/or instead of, the feedback control signal 635, the defect counts 645 may be sent from the first defect data display step 630 and may then be delivered to a second defect data display step 650. In the second defect data display step 650, the defect counts 645 may be displayed, for example, by being presented in the form of a graph, as illustrated in FIG. 3, showing the number of defects/cm$^2$ (defect surface density) on the surface of the workpiece 600 plotted as a function of time (measured in seconds). As shown in FIG. 3, in one illustrative embodiment, the number of metal bridges/cm$^2$ formed between features on the workpiece 600 may eventually cross the defect surface density threshold 300 (shown in dashed phantom) at the time 305 (shown in dotted phantom).

The display of the defect counts 645 in the second defect data display step 650 may be used to alert an engineer of the need to adjust the processing performed in the processing step j 605 to reduce at least one type of defect detected in the inspection step j 610. The engineer may also adjust, for example, the defect surface density threshold 300 (shown in dashed phantom). The engineer may also select, for example, the type of defect whose defect counts 645 are to be displayed in the second defect data display step 650.

As shown in FIG. 6, a feedback control signal 655 may be sent from the second defect data display step 650 to the processing step j 605 to adjust the processing performed in the processing step j 605 to reduce at least one type of defect detected in the inspection step j 610. In one illustrative embodiment, as shown in FIG. 3, when the number of metal bridges/cm$^2$ formed between features crosses the defect surface density threshold 300 (shown in dashed phantom) at the time 305 (shown in dotted phantom), the feedback control signal 655 may act to cause the processing performed in the processing step j 605 to increase the overetch time.

As shown in FIG. 5, in another illustrative embodiment, the number of ragged poly lines/cm$^2$ formed on the workpiece 600 may eventually cross the defect surface density threshold 500 (shown in dashed phantom) at the time 505 (shown in dotted phantom). In this illustrative embodiment, the feedback control signal 655 may act to cause the processing performed in the processing step j 605 to decrease the poly etch time.

In one illustrative embodiment, in both the first and second defect data display steps 630 and 650, the engineer may be provided with advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These capabilities may engender more optimal control of critical processing parameters, such as throughput accuracy, stability and repeatability, processing temperatures, mechanical tool parameters, and the like. This more optimal control of critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such an illustrative embodiment of a method of manufacturing according to the present invention, a monitoring and diagnostics system may be provided that monitors this variability and optimizes control of critical parameters.

Figure 7:
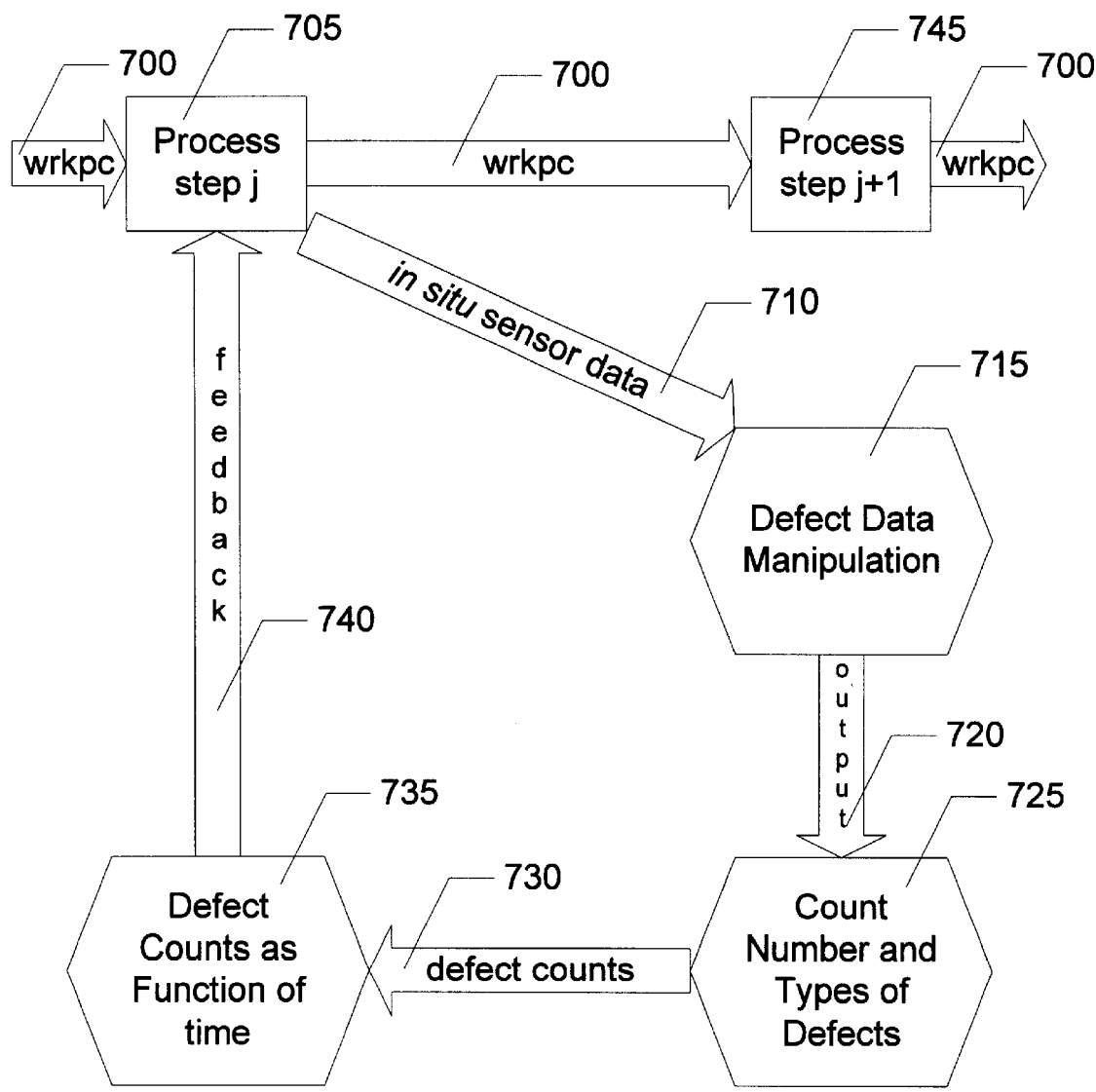

As shown in FIG. 7, a workpiece 700, such as a semiconducting substrate or wafer, for example, is delivered to a processing step j 705, where j may have any value from j=1 to j=1 N. The total number N of processing steps, such as masking, etching, depositing material and the like, used to form the finished workpiece 700, may range from N=1 to about any finite value.

As shown in FIG. 7, the workpiece 700 is sensed and/or scanned by an in situ sensor or monitor (not shown) in the processing step j 705 to detect data indicative of defective processing, and/or defective processing conditions, after the processing has begun in the processing step j 705. For example, in the processing step j 705, the workpiece 700 may be sensed and/or scanned by in situ sensors or monitors capable of detecting metal bridges formed between features on the workpiece 700, producing in situ sensor data 710 indicative of defective processing, and/or defective processing conditions. Additionally, and/or alternatively, in the processing step j 705, the workpiece 700 may be sensed and/or scanned by in situ sensors capable of detecting large particles in the processing chamber, microscratches, ragged polysilicon (poly) lines, blue dots, extra patterns, and the like, formed on the workpiece 700, again producing in situ sensor data 710 indicative of defective processing, and/or defective processing conditions. Additionally, and/or alternatively, the output/exhaust (not shown) of the tool doing the processing (not shown) in the processing step j 705 may be sensed and/or scanned by in situ sensors capable of detecting and measuring gas particles in the processing chamber over time, and the like, again producing in situ sensor data 710 indicative of changes in the actual processing, and/or defective processing, and/or defective processing conditions.

As shown in FIG. 7, the in situ sensor data 710 is sent from the processing step j 705 and delivered to a defect data manipulation step 715. In the defect data manipulation step 715, the in situ sensor data 710 may be manipulated, for example, by being classified according to the type of defect detected, producing output signal 720.

Figure 8:
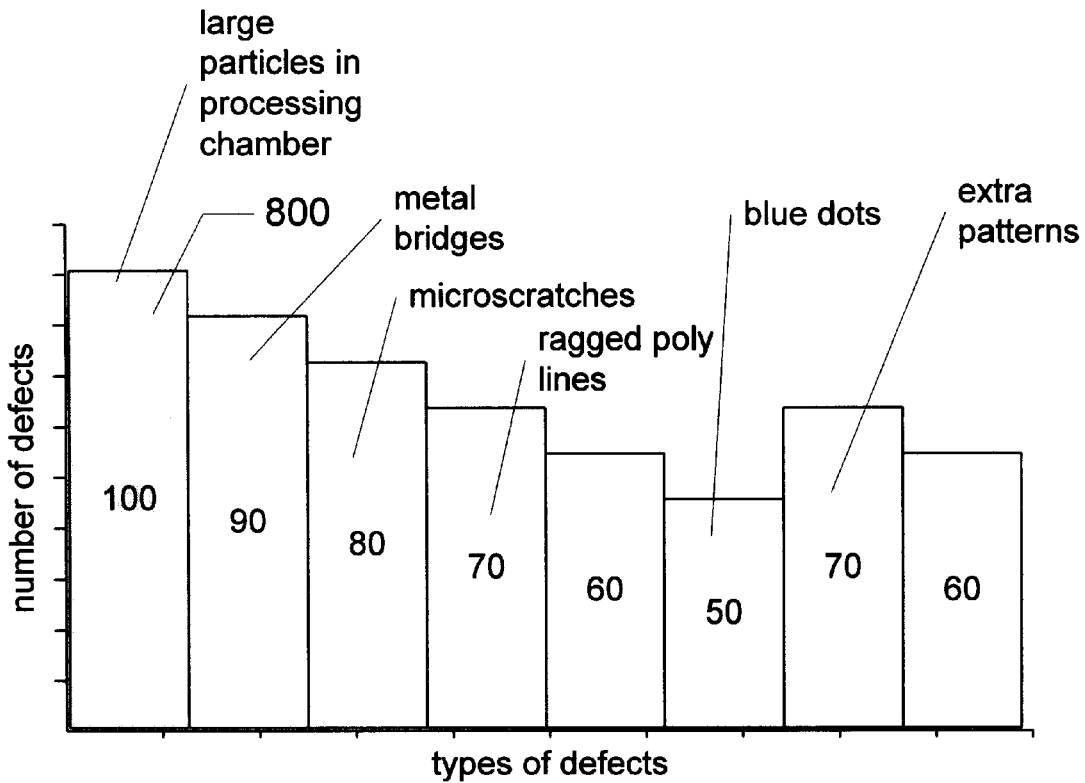

As shown in FIG. 7, the output signal 720 is sent from the defect data manipulation step 715 and delivered to a first defect data display step 725. In the first defect data display step 725, the output signal 720 may be displayed, for example, by being presented in the form of a histogram, as illustrated in FIG. 8, showing both the count number (defect counts 730) and the types of defects represented by the output signal 720. As shown in FIG. 8, in one illustrative embodiment, the number of large particles in the processing chamber (shown shaded at 800) is about 100, in the location scanned, for the duration of the scan. Similarly, the number of metal bridges is about 90, the number of microscratches is about 80, the number of ragged poly lines is about 70, the number of blue dots is about 50 and the number of extra patterns is about 70, for example.

The display of the output signal 720 in the first defect data display step 725 may be used to alert an engineer of the need to adjust the processing performed in the processing step j 705 to reduce at least one type of defect sensed and/or scanned by the in situ sensors in the processing step j 705. The engineer may also alter, for example, the classification of the in situ sensor data 710, in the defect data manipulation step 715, according to the type of defect detected, affecting the output signal 720 produced.

Figure 9:
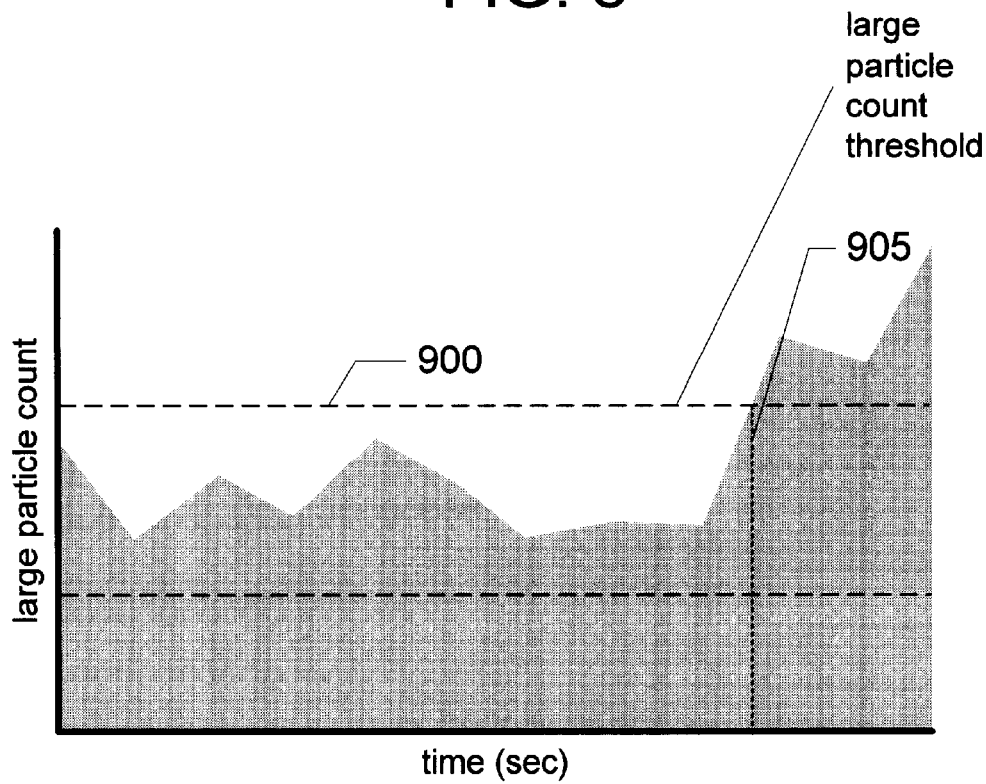

As shown in FIG. 7, the defect counts 730 are sent from the first defect data display step 725 and delivered to a second defect data display step 735. In the second defect data display step 735, the defect counts 730 may be displayed, for example, by being presented in the form of a graph, as illustrated in FIG. 9, showing the number of defects sensed and/or scanned by the in situ sensors in the processing step j 705 plotted as a function of time (measured in seconds). As shown in FIG. 9, in one illustrative embodiment, the number of large particles in the processing chamber eventually crosses a large particle count threshold 900 (shown in dashed phantom) at a time 905 (shown in dotted phantom).

The display of the defect counts 730 in the second defect data display step 735 may be used to alert an engineer of the need to adjust the processing performed in the processing step j 705 to reduce at least one type of defect sensed and/or scanned by the in situ sensors in the processing step j 705. The engineer may also adjust, for example, the defect surface density threshold 300 (shown in dashed phantom). The engineer may also select, for example, the type of defect whose defect counts 730 are to be displayed in the second defect data display step 735.

As shown in FIG. 7, a feedback control signal 740 is sent from the second defect data display step 735 to the processing step j 705 to adjust the processing performed in the processing step j 705 to reduce at least one type of defect detected, by being sensed and/or scanned by the in situ sensors, for example, in the processing step j 705. In one illustrative embodiment, as shown in FIG. 9, when the number of large particles in the processing chamber crosses the large particle count threshold 900 (shown in dashed phantom) at the time 905 (shown in dotted phantom), the feedback control signal 740 may act to cause the processing performed in the processing step j 705 to do chamber pasting and/or initiate chamber conditioning, for example.

As shown in FIG. 7, the workpiece 700 is sent from the processing step j 705 and delivered to a processing step j+1 745. In the processing step j+1 745, the workpiece 700 undergoes another one of the total number N of processing steps, such as masking, etching, depositing material and the like, used to form the finished workpiece 700. As shown in FIG. 7, the workpiece 700 is then sent from the processing step j+1 745. After the processing has begun in the processing step j+1 745, the workpiece 700 may be sensed and/or scanned by in situ sensors in the processing step j+1 745 to detect data indicative of defective processing, and/or defective processing conditions, as described above.

As shown in FIG. 2, in another illustrative embodiment, the number of metal bridges (shown shaded at 200) formed between features on the workpiece 700 is about 80, in the location scanned, for the duration of the scan. As shown in FIG. 3, in this illustrative embodiment, the number of metal bridges/$cm^2$ formed between features on the workpiece 700 eventually crosses the defect surface density threshold 300 (shown in dashed phantom) at the time 305 (shown in dotted phantom). In this illustrative embodiment, as shown in FIG. 7, the feedback control signal 740 may act to cause the processing performed in the processing step j 705 to increase the overetch time.

As shown in FIG. 4, in yet another illustrative embodiment, the number of ragged poly lines (shown shaded at 400) formed on the workpiece 100 is about 50, in the location scanned, for the duration of the scan. As shown in FIG. 5, in this illustrative embodiment, the number of ragged poly lines/$cm^2$ formed on the workpiece 100 eventually crosses the defect surface density threshold 500 (shown in dashed phantom) at the time 505 (shown in dotted phantom). In this illustrative embodiment, as shown in FIG. 7, the feedback control signal 740 may act to cause the processing performed in the processing step j 705 to decrease the poly etch time.

In one illustrative embodiment, in both the first and second defect data display steps 725 and 735, the engineer may be provided with advanced process data monitoring capabilities, such as the ability to provide historical parametric data in a user-friendly format, as well as event logging, real-time graphical display of both current processing parameters and the processing parameters of the entire run, and remote, ie., local site and worldwide, monitoring. These capabilities may engender more optimal control of critical processing parameters, such as throughput accuracy, stability and repeatability, processing temperatures, mechanical tool parameters, and the like. This more optimal control of critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such an illustrative embodiment of a method of manufacturing according to the present invention, a monitoring and diagnostics system may be provided that monitors this variability and optimizes control of critical parameters.

Figure 10:
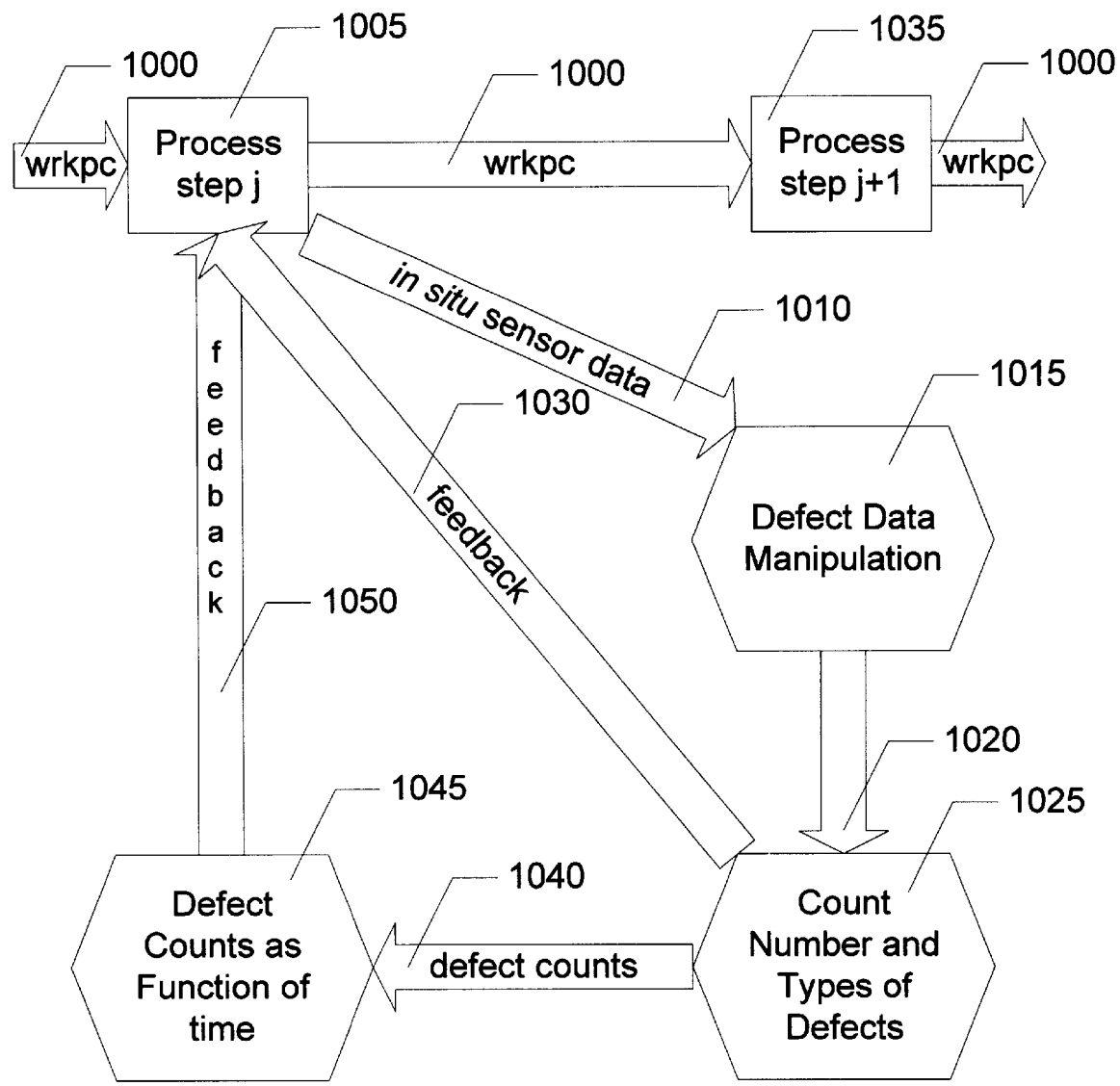

As shown in FIG. 10, a workpiece 1000, such as a semiconducting substrate or wafer, for example, is delivered to a processing step j 1005, where j may have any value from j=1 to j=N. The total number N of processing steps, such as masking, etching, depositing material and the like, used to form the finished workpiece 1000, may range from N=1 to about any finite value.

As shown in FIG. 10, the workpiece 1000 is sensed and/or scanned by in situ sensors (not shown) in the processing step j 1005 to detect data indicative of defective processing, and/or defective processing conditions, after the processing has begun in the processing step j 1005. For example, in the, processing step j 1005, the workpiece 1000 may be sensed and/or scanned by in situ sensors capable of detecting metal bridges formed between features on the workpiece 1000, producing in situ sensor data 1010 indicative of defective processing, and/or defective processing conditions. Additionally, and/or alternatively, in the processing step j 1005, the workpiece 1000 may be sensed and/or scanned by in situ sensors capable of detecting large particles in the processing chamber, microscratches, ragged polysilicon (poly) lines, blue dots, extra patterns, and the like, formed on the workpiece 1000, again producing the in situ sensor data 1010 indicative of defective processing, and/or defective processing conditions.

As shown in FIG. 10, the in situ sensor data 1010 is sent from the processing step j 1005 and delivered to a defect data manipulation step 1015. In the defect data manipulation step 1015, the in situ sensor data 1010 may be manipulated, for example, by being classified according to the type of defect detected, producing the output signal 1020.

As shown in FIG. 10, the output signal 1020 is sent from the defect data manipulation step 1015 and delivered to a first defect data display step 1025. In the first defect data display step 1025, the output signal 1020 may be displayed, for example, by being presented in the form of a histogram, as illustrated in FIGS. 2, 4 and 8, showing both the count number (defect counts 1040) and the types of defects represented by the output signal 1020. As shown in FIG. 2, in one illustrative embodiment, the number of metal bridges (shown shaded at 200) formed between features on the workpiece 1000 is about 80, in the location scanned, for the duration of the scan. Similarly, as shown in FIG. 4, in another illustrative embodiment, the number of ragged poly lines (shown shaded at 400) is about 50, in the location scanned, for the duration of the scan. Likewise, as shown in FIG. 8, in yet another illustrative embodiment, the number of large particles in the processing chamber (shown shaded at 800) is about 100, in the location scanned, for the duration of the scan.

The display of the output signal 1020 in the first defect data display step 1025 may be used to alert an engineer of the need to adjust the processing performed in the processing step j 1005 to reduce at least one type of defect sensed and/or scanned by the in situ sensors in the processing step j 1005. The engineer may also alter, for example, the classification of the in situ sensor data 1010, in the defect data manipulation step 1015, according to the type of defect detected, affecting the output signal 1020 produced.

As shown in FIG. 10, a feedback control signal 1030 is sent from the first defect data display step 1025 to the processing step j 1005 to adjust the processing performed in the processing step j 1005 to reduce at least one type of defect detected, by being sensed and/or scanned by the in situ sensors, for example, in the processing step j 1005. In one illustrative embodiment, as shown in FIG. 8, when the number of large particles (shown shaded at 800) exceeds a predetermined value, for example, about 100, the feedback control signal 1030 may act to cause the processing performed in the processing step j 1005 to do chamber pasting and/or initiate chamber conditioning, for example.

In another illustrative embodiment, as shown in FIG. 2, when the number of metal bridges (shown shaded at 200) formed between features on the workpiece 1000 exceeds a predetermined value, for example, about 80, the feedback control signal 1030 may act to cause the processing performed in the processing step j 1005 to increase the overetch time. In yet another illustrative embodiment, as shown in FIG. 4, when the number of ragged poly lines (shown shaded at 400) formed on the workpiece 1000 exceeds a predetermined value, for example, about 50, the feedback control signal 1030 may act to cause the processing performed in the processing step j 1005 to decrease the poly etch time.

As shown in FIG. 10, the workpiece 1000 is sent from the processing step j 1005 and delivered to a processing step j+1 1035. In the processing step j+1 1035, the workpiece 1000 undergoes another one of the total number N of processing steps, such as masking, etching, depositing material and the like, used to form the finished workpiece 1000.

As shown in FIG. 10, the workpiece 1000 is then sent from the processing step j+1 1035. After the processing has begun in the processing step j+1 1035, the workpiece 1000 may be sensed and/or scanned by in situ sensors in the processing step j+1 1035 to detect data indicative of defective processing, and/or defective processing conditions, as described above.

As shown in FIG. 10, in addition to, and/or instead of, the feedback control signal 1030, the defect counts 1040 may be sent from the first defect data display step 1025 and may then be delivered to a second defect data display step 1045. In the second defect data display step 1045, the defect counts 1040 may be displayed, for example, by being presented in the form of a graph, as illustrated in FIG. 9, showing the number of defects sensed and/or scanned by the in situ sensors in the processing step j 1005 plotted as a function of time (measured in seconds). As shown in FIG. 9, in one illustrative embodiment, the number of large particles in the processing chamber eventually crosses the large particle count threshold 900 (shown in dashed phantom) at the time 905 (shown in dotted phantom).

The display of the defect counts 1040 in the second defect data display step 1045 may be used to alert an engineer of the need to adjust the processing performed in the processing step j 1005 to reduce at least one type of defect sensed and/or scanned by the in situ sensors in the processing step j 1005. The engineer may also adjust, (for example, the defect surface density threshold 300 (shown in dashed phantom). The engineer may also select, for example, the type of defect whose defect counts 1040 are to be displayed in the second defect data display step 1045.

As shown in FIG. 10, a feedback control signal 1050 may be sent from the second defect data display step 1045 to the processing step j 1005 to adjust the processing performed in the processing step j 1005 to reduce at least one type of defect detected, by being sensed and/or scanned by the in situ sensors, for example, in the processing step j 1005. In one illustrative embodiment, as shown in FIG. 9, the feedback control signal 1050 may act to cause the processing performed in the processing step j 1005 to do chamber pasting and/or initiate chamber conditioning, for example.

In another illustrative embodiment, as shown in FIG. 3, when the number of metal bridges/cm$^2$ formed between features crosses the defect surface density threshold 300 (shown in dashed phantom) at the time 305 (shown in dotted phantom), the feedback control signal 1050 may act to cause the processing performed in the processing step j 1005 to increase the overetch time.

As shown in FIG. 5, in yet another illustrative embodiment, the number of ragged poly lines/cm$^2$ formed on the workpiece 1000 may eventually cross the defect surface density threshold 500 (shown in dashed phantom) at the time 505 (shown in dotted phantom). In this illustrative embodiment, the feedback control signal 1050 may act to cause the processing performed in the processing step j 1005 to decrease the poly etch time.

In one illustrative embodiment, in both the first and second defect data display steps 1025 and 1045, the engineer may be provided with advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These capabilities may engender more optimal control of critical processing parameters, such as throughput accuracy, stability and repeatability, processing temperatures, mechanical tool parameters, and the like. This more optimal control of critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such an illustrative embodiment of a method of manufacturing according to the present invention, a monitoring and diagnostics system may be provided that monitors this variability and optimizes control of critical parameters.

Any of the above-disclosed embodiments of a method of manufacturing according to the present invention enables the use of defect data signals sent from an inspection tool to make real-time processing tool adjustments, either manually and/or automatically, to improve and/or better control the yield. This defect detection may be downstream from the processing step (see, for example, FIGS. 1 and 6), or, alternatively and/or additionally, may be performed in situ (see, for example, FIGS. 7 and 10). Additionally, any of the above-disclosed embodiments of a method of manufacturing according to the present invention enables semiconductor device fabrication with increased device density and precision and enable a streamlined and simplified process flow, thereby decreasing the complexity and lowering the costs of the manufacturing process and increasing throughput.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of manufacturing, the method comprising:
   processing a workpiece in a processing step;
   detecting defect data after the processing of the workpiece in the processing step has begun;
   forming an output signal corresponding to at least one type of defect based on the defect data, wherein the formation of the output signal includes counting the number of the at least one type of defect and determining a surface density of the at least one type of defect as a function of time; and
   feeding back a control signal based on the output signal to adjust the processing performed in the processing step to reduce the at least one type of defect.

2. The method of claim 1, wherein the feeding back of the control signal based on the output signal includes feeding back the control signal when the number of the at least one type of defect is at least about a first predetermined value.

3. The method of claim 2, wherein the feeding back of the control signal based on the output signal further includes feeding back the control signal when the surface density of the at least one type of defect is at least about a second predetermined value.

4. The method of claim 1, wherein the feeding back of the control signal based on the output signal includes feeding back the control signal when the surface density of the at least one type of defect is at least about a second predetermined value.

5. A method of manufacturing, the method comprising:
   processing a first workpiece in a processing step;
   detecting at least one type of defect in an inspection step after the processing of the first workpiece in the processing step;
   forming an output signal corresponding to at least one type of detected defect, wherein the formation of the output signal includes counting the number of the at least one type of defect and determining a surface density of the at least one type of defect as a function of time; and
   feeding back a control signal based on the output signal to adjust the processing performed in the processing step on a second workpiece to reduce the at least one type of defect.

6. The method of claim 5, wherein the feeding back of the control signal based on the output signal includes feeding back the control signal when the number of the at least one type of defect is at least about a first predetermined value.

7. The method of claim 5, wherein the feeding back of the control signal based on the output signal further includes feeding back the control signal when the surface density of the at least one type of defect is at least about a second predetermined value.

8. A method of manufacturing, the method comprising:

processing a workpiece in a processing step;

detecting defect data using an in situ sensor after the processing of the workpiece in the processing step has begun;

forming an output signal corresponding to at least one type of defect based on the defect data, wherein the formation of the output signal includes counting the number of the at least one type of defect and determining a surface density of the at least one type of defect as a function of time; and feeding back a control signal based on the output signal to adjust the processing performed on the workpiece in the processing step to reduce the at least one type of defect.

9. The method of claim 8, wherein the feeding back of the control signal based on the output signal includes feeding back the control signal when the number of the at least one type of defect is at least about a first predetermined value.

10. The method of claim 8, wherein the feeding back of the control signal based on the output signal further includes feeding back the control signal when the surface density of the at least one type of defect is at least about a second predetermined value.

11. A method of manufacturing, the method comprising:

processing a workpiece in a processing step;

detecting defect data after the processing of the workpiece in the processing step has begun;

forming an output signal corresponding to at least one type of defect based on the defect data, wherein the formation of the output signal includes counting the number of the at least one type of defect, determining a surface density of the at least one type of defect as a function of time, counting the number of a second type of defect different than the at least one type of defect and determining a surface density of the second type of defect as a function of time; and feeding back a control signal when the number of the at least one type of defect is at least about a first predetermined value, when the surface density of the at least one type of defect is at least about a second predetermined value, when the number of the second type of defect is at least about a third predetermined value and when the surface density of the second type of defect is at least about a fourth predetermined value to adjust the processing performed in the processing step to reduce the at least one type of defect.

12. A method of manufacturing, the method comprising:

processing a first workpiece in a processing step;

detecting at least one type of defect in an inspection step after the processing of the first workpiece in the processing step;

forming an output signal corresponding to at least one type of detected defect, wherein the formation of the output signal includes counting the number of the at least one type of defect, determining a surface density of the at least one type of defect as a function of time, counting the number of a second type of defect different than the at least one type of defect and determining a surface density of the second type of defect as a function of time; and feeding back a control signal when the number of the at least one type of defect is at least about a first predetermined value, when the surface density of the at least one type of defect is at least about a second predetermined value, when the number of the second type of defect is at least about a third predetermined value and when the surface density of the second type of defect is at least about a fourth predetermined value to adjust the processing performed in the processing step on a second workpiece to reduce the at least one type of defect.

13. A method of manufacturing, the method comprising:

processing a workpiece in a processing step;

detecting defect data using an in situ sensor after the processing of the workpiece in the processing step has begun;

forming an output signal corresponding to at least one type of defect based on the defect data, wherein the formation of the output signal includes counting the number of the at least one type of defect, determining a surface density of the at least one type of defect as a function of time, counting the number of a second type of defect different than the at least one type of defect and determining a surface density of the second type of defect as a function of time; and feeding back a control signal when the number of the at least one type of defect is at least about a first predetermined value, when the surface density of the at least one type of defect is at least about a second predetermined value, when the number of the second type of defect is at least about a third predetermined value and when the surface density of the second type of defect is at least about a fourth predetermined value to adjust the processing performed on the workpiece in the processing step to reduce the at least one type of defect.

* * * * *